US012644552B1

(12) United States Patent
Heaps et al.

(10) Patent No.: US 12,644,552 B1
(45) Date of Patent: Jun. 2, 2026

(54) SANITARY TEE HAVING PIPE HANGERS

(71) Applicant: VACUUM TECHNOLOGIES, LLC, Sheridan, WY (US)

(72) Inventors: Justin Taylor Heaps, Ranchester, WY (US); Steve W. Lieneman, Sheridan, WY (US); Jared Leroy Meacham, Sheridan, WY (US); Clay D. Price, Sheridan, WY (US); Eldered Tom Tucker, Sheridan, WY (US); John F. Tucker, Sheridan, WY (US)

(73) Assignee: Vacuum Technologies, LLC, Sheridan, WY (US)

( * ) Notice: Subject to any disclaimer, the term of this patent is extended or adjusted under 35 U.S.C. 154(b) by 556 days.

(21) Appl. No.: 18/131,241

(22) Filed: Apr. 5, 2023

Related U.S. Application Data

(60) Provisional application No. 63/327,432, filed on Apr. 5, 2022.

(51) Int. Cl.
| | |
|---|---|
| *F16L 41/02* | (2006.01) |
| *A47L 5/38* | (2006.01) |
| *A47L 7/00* | (2006.01) |
| *A47L 9/16* | (2006.01) |
| *A47L 9/24* | (2006.01) |
| *B60S 3/00* | (2006.01) |

(52) U.S. Cl.
CPC .............. *F16L 41/021* (2013.01); *A47L 5/38* (2013.01); *A47L 7/0076* (2013.01); *A47L 9/1658* (2013.01); *A47L 9/242* (2013.01); *B60S 3/008* (2013.01)

(58) Field of Classification Search
CPC ...... B60S 3/008; A47L 7/0076; A47L 7/0095; A47L 5/38; B08B 15/002; D01H 11/005; F16L 41/021; F16L 41/10
USPC .................... 15/314, 315, 312.1, 312.2, 301; 285/131.1–133.3, 7
See application file for complete search history.

(56) References Cited

U.S. PATENT DOCUMENTS

| | | | | |
|---|---|---|---|---|
| 979,652 | A | * 12/1910 | Church ..................... | F16L 5/00 |
| | | | | 285/137.11 |
| 1,029,531 | A | * 6/1912 | Day .......................... | B07B 7/08 |
| | | | | 209/147 |
| 1,676,969 | A | * 7/1928 | Sutton ..................... | B07B 11/00 |
| | | | | 454/67 |
| 2,121,558 | A | * 6/1938 | Coe ......................... | B21D 39/04 |
| | | | | 285/133.11 |

(Continued)

*Primary Examiner* — Bryan R Muller
(74) *Attorney, Agent, or Firm* — Nyemaster Goode P.C.

(57) ABSTRACT

A tee coupling for coupling a handheld vacuum line to a main vacuum line of a commercial vacuum system without the need for external adapters includes a cylindrical main body portion with an axis, an inner diameter smaller than the outer diameter of the main vacuum line segments, a downstream end and an upstream end extending in opposite directions from the main body portion along the same axis, the downstream end and the upstream end each having an inner diameter at least as large as the outer diameter of a main vacuum line segment. a third end extending from the main body portion at an angle that is typically not a right angle from the axis; and a throat between the third end and the main body portion. The throat meets the main body portion at an angle that is not 90 degrees and is biased toward the downstream end.

18 Claims, 3 Drawing Sheets

(56) References Cited

U.S. PATENT DOCUMENTS

| | | | | |
|---|---|---|---|---|
| 3,543,325 A * | 12/1970 | Hamrick | A47L 9/102 | |
| | | | 55/467 | |
| 3,633,943 A * | 1/1972 | Ramm | F16L 41/021 | |
| | | | 285/133.11 | |
| 3,891,248 A * | 6/1975 | Kannapell | F16L 41/08 | |
| | | | 285/224 | |
| 4,829,626 A * | 5/1989 | Harkonen | A47L 9/2821 | |
| | | | 15/314 | |
| 5,183,298 A * | 2/1993 | Harrington | F16L 25/14 | |
| | | | 285/422 | |
| 6,012,199 A * | 1/2000 | Litomisky | B23Q 11/0046 | |
| | | | 15/301 | |
| 6,182,326 B1 * | 2/2001 | Rhea | B08B 15/002 | |
| | | | 285/133.11 | |
| 6,833,016 B2 * | 12/2004 | Witter | B04C 5/13 | |
| | | | 55/346 | |
| 7,686,346 B1 * | 3/2010 | Buccicone | F16L 37/091 | |
| | | | 285/129.1 | |
| 2005/0082825 A1 * | 4/2005 | Nakagawa | B29C 66/112 | |
| | | | 285/133.11 | |
| 2013/0019447 A1 * | 1/2013 | Fitch | F16L 17/10 | |
| | | | 285/133.21 | |
| 2017/0325644 A1 * | 11/2017 | Muyters | A47L 9/2842 | |

* cited by examiner

SANITARY TEE HAVING PIPE HANGERS

CROSS-REFERENCE TO RELATED APPLICATION

This application claims benefit of and priority to U.S. Provisional Application No. 63/327,432, filed on Apr. 5, 2022, entitled "SANITARY TEE HAVING PIPE HANGERS," the entire disclosure of which is hereby incorporated herein by reference.

BACKGROUND

Commercial vehicle washing systems often have some form of vacuuming system associated with them. Typically, the car wash facility includes some kind of vacuum system to aid a user in cleaning the interior of the vehicle being treated when the user may or may not also be using the car wash facility to wash the exterior of their vehicle. The vacuum systems are typically in the form of a single canister vacuum that the user can use to manually vacuum the interior, but can be a multiple bay overhead suspended vacuum system if multiple vehicle vacuum locations are available as is occasionally the case in continuous vehicle commercial washing systems.

The present disclosure generally provides a tee coupling which connects the vacuum cyclonic separator to the vehicle vacuum system according to the present disclosure.

SUMMARY

One aspect of the present disclosure includes a commercial vehicle vacuum system having a vacuum source, a main vacuum line connected to the vacuum source, and having main vacuum line segments each having an outer diameter, a handheld vacuum line coupled to the main vacuum line, a filtration element disposed between the handheld vacuum line and the main vacuum line and having an inlet attached to the handheld vacuum line, an outlet, and an outlet pipe attached to the outlet. Included is a tee coupling for coupling the handheld vacuum line to the main vacuum line and having a main body portion having a cylindrical shape with an axis, the main body portion having an inner diameter smaller than the outer diameter of the main vacuum line segments, a downstream end and an upstream end extending in opposite directions from the main body portion along the same axis, the downstream end and the upstream end each having an inner diameter at least as large as the outer diameter of the main vacuum line segments, a third end extending from the main body portion at an angle from the axis, and a throat between the third end and the main body portion.

Another aspect of the present disclosure includes a tee coupling for coupling a handheld vacuum line to a main vacuum line of a commercial vacuum system without the need for external adapters includes a cylindrical main body portion with an axis, an inner diameter smaller than the outer diameter of the main vacuum line segments, a downstream end and an upstream end extending in opposite directions from the main body portion along the same axis, the downstream end and the upstream end each having an inner diameter at least as large as the outer diameter of a main vacuum line segment, a third end extending from the main body portion at an angle from the axis; and a throat between the third end and the main body portion. The throat meets the main body portion at an angle biased toward the downstream end.

Yet another aspect of the present disclosure is generally directed toward a vehicle vacuum system, typically a commercial vacuum system for vacuuming cars, trucks and other vehicles. The system typically includes: a vacuum source; a main vacuum line connected to the vacuum source, the main vacuum line comprising a plurality of main vacuum line segments each having a main line outer diameter; a handheld vacuum line coupled to the main vacuum line; a filtration element disposed between the handheld vacuum line and the main vacuum line, the filtration element comprising an inlet attached to the handheld vacuum line, a filtration element outlet, and an outlet pipe attached to the filtration element outlet having an outlet outer diameter; and a tee coupling for coupling the handheld vacuum filtration element to the main vacuum line. The tee coupling typically includes: a main body portion having a substantially cylindrical shape with an axis, the main body portion having a main body inner diameter and a main body outer diameter; a downstream end portion and an upstream end portion extending in opposite directions away from the main body portion and concentric with the axis of the main body outer diameter, the downstream end portion having a downstream inner diameter and a downstream outer diameter and the upstream end portion having an upstream inner diameter and an upstream outer diameter; a vacuum inlet portion that engages the outlet pipe attached to the filtration element outlet and where the vacuum inlet portion extends downwardly from the main body portion at an angle from the axis and where the vacuum inlet portion has a vacuum inlet portion inner diameter and a vacuum inlet portion outer diameter; and a throat portion between the vacuum inlet portion and the main body portion where the throat portion has an exterior diameter that is less than the inner diameter of the vacuum inlet portion inner diameter and where the interior surface of the throat portion has a curved interior surface such that it directs an intake airflow into the main body portion from the throat portion in the direction of a main vacuum line airflow through the main body portion during use and at an angle that is not perpendicular to the direction of the main vacuum line airflow. The main body inner diameter is typically less than the upstream inner diameter and the downstream inner diameter.

Another aspect of the present disclosure is generally directed toward a tee coupling that includes: a main body portion having a substantially cylindrical shape with an axis, the main body portion having a main body inner diameter and a main body outer diameter; a downstream end portion and an upstream end portion extending in opposite directions away from the main body portion and concentric with the axis of the main body outer diameter, the downstream end portion having a downstream inner diameter and a downstream outer diameter and the upstream end portion having an upstream inner diameter and an upstream outer diameter; a vacuum inlet portion that engages an outlet pipe attached to the filtration element outlet and where the vacuum inlet portion extends downwardly from the main body portion at an angle from the axis and where the vacuum inlet portion has a vacuum inlet portion inner diameter and a vacuum inlet portion outer diameter; and a throat portion between the vacuum inlet portion and the main body portion where the throat portion has an exterior diameter that is less than the inner diameter of the vacuum inlet portion inner diameter and where the interior surface of the throat portion has a curved interior surface such that it directs an intake airflow into the main body portion from the throat portion in the direction of a main vacuum line airflow through the main body portion during use and at an angle that is not perpendicular to the direction of the main vacuum line airflow through the main body portion. The main body inner diameter is typically less than the upstream inner diameter and the downstream inner diameter.

Another aspect of the present disclosure is generally directed toward a tee coupling having: a main body portion having a substantially cylindrical shape with an axis, the main body portion having a main body inner diameter that is smaller than the line outer diameter of the main vacuum line, a main body outer diameter, and a stiffening rib located vertically along a periphery of the main body portion; a downstream end portion and an upstream end portion extending in opposite directions from the main body portion along the same axis, the downstream end portion having a downstream inner diameter and a downstream outer diameter, the upstream end having an upstream inner diameter and an upstream outer diameter where the downstream inner diameter is larger than the main body inner diameter and the upstream inner diameter is larger than the main body inner diameter, and the downstream end portion and the upstream end portion each have a chamfered exterior facing edge. The main body outer diameter of the main body portion is not as large as the upstream outer diameter and the downstream outer diameter. The tee coupling typically further includes a third end extending downwardly from the main body portion, the third end having a third inner diameter and a throat portion between the vacuum inlet portion and the main body portion where the throat portion has an exterior diameter that is less than the inner diameter of the vacuum inlet portion inner diameter and where the interior surface of the throat portion has a curved interior surface such that it directs an intake airflow into the main body portion from the throat portion in the direction of a main vacuum line airflow through the main body portion during use and at an angle that is not perpendicular or parallel to the direction of the main vacuum line airflow through the main body portion. The vacuum inlet portion extends from the main body portion perpendicular to the axis and where the tee coupling may be constructed from a glass filled polypropylene. The tee coupling further typically includes a first visible circumferential groove on an exterior surface of the downstream end portion and proximate the main body portion and a second visible circumferential groove on an exterior surface of the upstream end and proximate the main body portion.

These and other aspects, objects, and features of the present invention will be understood and appreciated by those skilled in the art upon studying the following specification, claims, and appended drawings.

DETAILED DESCRIPTION OF EMBODIMENTS

It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
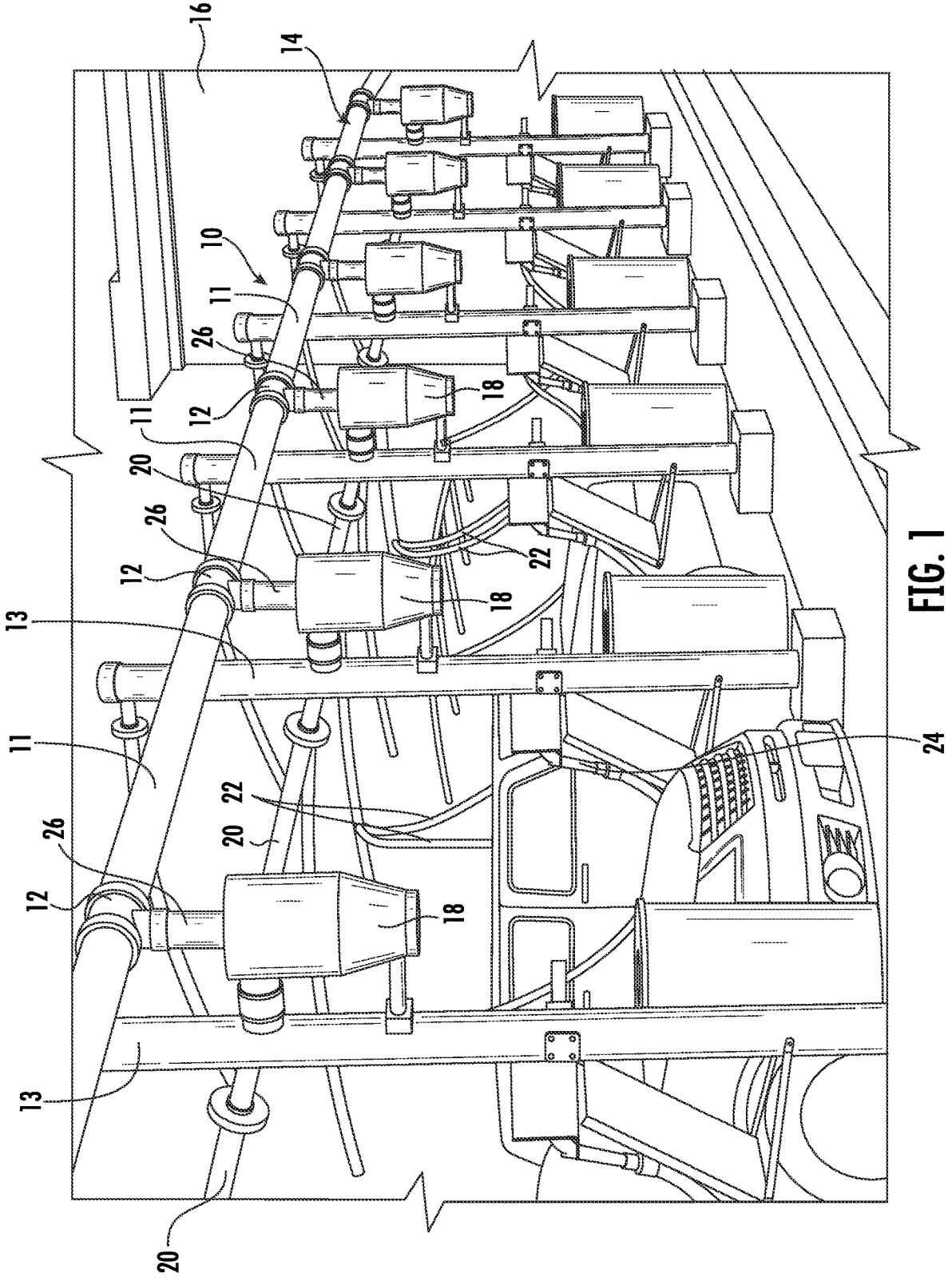
FIG. 1 is a perspective view of a multiple bay overhead suspended vacuum system employing a centrally located vacuum system located remote from the individual bays of the multiple bay overhead suspended vacuum system and demonstrating the presence of a tee coupling of the present disclosure used to connect the piping of the vacuum system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows an overhead vacuum system 10 utilizing the sanitary tee 12 as described in detail below. The system 10, as shown in FIG. 1, typically uses a plurality of sanitary tees to interconnect a plurality of main conduit segments 11, which are typically aluminum pipe segments, of the overhead vacuum system 10 to extend the vacuum line from a location not proximate the individual vacuum bays such as in a main facility building or an outbuilding where the unit providing the vacuum force to each of the individual units may be located. The systems of the present disclosure typically employ a series of interconnected components to attach a vacuum tool 24 that is typically a handheld vacuum tool used by the user when cleaning the interior of the vehicle such as a crevice tool at the user end of a flexible vacuum hose 22. The vacuum tool allows a user to utilize the vacuum system of the vehicle/car washing and/or vacuuming facility 16 to clean small particles and other difficult to remove elements from the seats and floor of their vehicle. As shown in FIG. 1, the vehicle/car washing and/or vacuuming facility 16 may include two hoses 22 hung from an arch bar 20, typically an end of the arch bar 20 distal the posts 13 and the main vacuum line 14, for each parking space such that the user has easy access to the hose and vacuum tool on either side of their vehicle. One hose from each of two adjacent arch bars facilitate ease of use on each side of the vehicle.

The vacuum tool 24, which may be a crevasse tool, brush or the link and may be interchangeable and removable by the user by hand and without the use of tools or locked into engagement with a hose 22. The vacuum tool 24 typically connects to the vacuum hose 22 and is typically removable and interchangeable with other vacuum tools. The flexible hose 22 may attach to the main vacuum line 14 directly, or as shown in FIG. 1, there may be a filtration element between the hose 22 and the main vacuum line 14. An example of a filtration element is a woven or non-woven material positioned in the airflow pathway to capture particles where the woven or non-woven particulate capturing filter is replaced periodically after a period of use or when the filter has captured a predetermined amount of particulates from the air passing therethrough. Another exemplary filter is a cyclonic separator 18. The cyclonic separator 18, which can operate as a filtration system, uses cyclonic movement of the air to separate small particles from the air flow and prevent those particles from entering the main vacuum line 14 and getting back to the vacuum pump. The cyclonic separator/filtration element may be located higher up on one of the posts 13 to allow for easy removal of separated debris by opening the bottom of the cyclonic separator 18 and allowing the debris to fall out where a user may dispose of it. One such cyclonic separator that may be used in the context of the present disclosure is that shown in U.S. Pat. No. 11,358,156, entitled "DUAL CONNECTION CYCLONIC OVERHEAD SEPARATOR," which issued on Jun. 14, 2022, the entire disclosure of which is hereby incorporated by reference.

From the cyclonic separator 18, which again is a type of a filtration system, the filtered air continues to the main vacuum line 14. As shown in FIG. 1, the cyclonic separator 18 is below the main vacuum line 14 and an outlet pipe 26 extends from the exit of the cyclonic separator 18 to the main vacuum line 14. It should be known that any other configuration of the cyclonic separator 18 and main vacuum line 14 may be contemplated. For example, a filtration system may be located proximate the remotely located vacuum source and include an air filtering honeycomb fabric filtration system to capture particulates in the air before they reach the main system as discussed above. Such a particulate capturing filter may be the only filtering system employed or may be employed in addition to the cyclonic separator 18 at more than one location such as between the cyclonic separator 18 and the main vacuum line 14. It is also possible that a filter system and a cyclonic separator may be omitted from the systems of the present disclosure as well, but this is not typically the case since large pieces of debris may damage the vacuum supply system and motor located remotely from each individual vacuuming bay in the vehicle/car washing and/or vacuuming facility 16.

FIGS. 2-5 disclose, in detail, a sanitary tee coupling 12 of the present disclosure that may be used to connect the cyclonic separators(s) 18 or other filtering systems to the main vacuum line 14. The sanitary tee coupling 12 of the present disclosure typically has cylindrical ends and a cylindrical downwardly extending portion. In a preferred embodiment, a main vacuum system has an outlet polyvinyl chloride (PVC) pipe 26 of the cyclonic separator 18 that connects to metal (typically aluminum) piping for the main vacuum line 14 using the sanitary tee coupling 12. The metal piping is typically utilized for improved structural stability in varying weather conditions, for improved weather resistance against damage from storms or other weather conditions, and for the ability to avoid expanding over time due to the passage of time and/or the changes in temperatures in a given time period. PVC piping would normally exhibit these drawbacks. Current solutions for replacing PVC piping with metal piping require specialized adapters to allow for proper fitting and, as a result are costlier, more time consuming to install and often do not work properly due to errors in the installation that may happen due to added steps necessary to make the connections functional. The sanitary tee coupling 12 of the present disclosure may be used without the employment of an adapter thus typically making the installation faster, easier, and more stable when in use. Moreover, the sanitary tee coupling 12 is typically not constructed of PVC, but rather sized to engage aluminum or PVC piping that may make up the segments 11. The sanitary tee coupling 12 is typically a 10% glass-filled polypropylene which is much less brittle than PVC in cold temperatures and is typically a black color, which slows down deterioration from ultraviolet (UV) light. The black color also is more aesthetically pleasing to the average person when engaged to the other segments of the systems of the present disclosure.

The sanitary tee coupling 12 of the present disclosure is adapted to connect the existing piping system more easily than is currently available and without the use of adapters, as is currently necessary for a fully functioning system.

The sanitary tee coupling 12 of the present disclosure typically has a first end or upstream end 30, a second end or downstream end 32 and a third end or filter facing end 36. The first and second ends 30, 32 extend from opposite ends of a main body portion along the same axis. The first and second ends are configured and sized to connect to segment ends of the main vacuum line 14 and may form part of the overall main vacuum line 14. The inner diameter 30*d* of the upstream end 30 is substantially the same as the outer diameter of the segment end of the main vacuum line 14. This allows for the segment ends of the main vacuum line 14 to fit within the first and second ends 30, 32 of the sanitary tee coupling 12. Preferably, the main vacuum line 14 fits into the first and second ends 30, 32 on a line-to-line fit, but a slight interference fit is acceptable as well. The end can be sealed as well with an air tight pneumatic sealant, typically an organic compound that comprises a methacrylate ester. One such composition may include from about 10% to about 30% by weight of the composition of 2-hydroxyethyl methacrylate, from about 1% to about 5% by weight of the composition of dimethyl benzyl hydroperoxide, from about 0.1 to about 1% by weight of the composition of maleic acid, from about 0.1 to about 1% by weight of the composition of acrylic acid, and from about 0.1 to about 1% by weight of the composition of cumene. However, sealants are not typically utilized.

Figure 2:
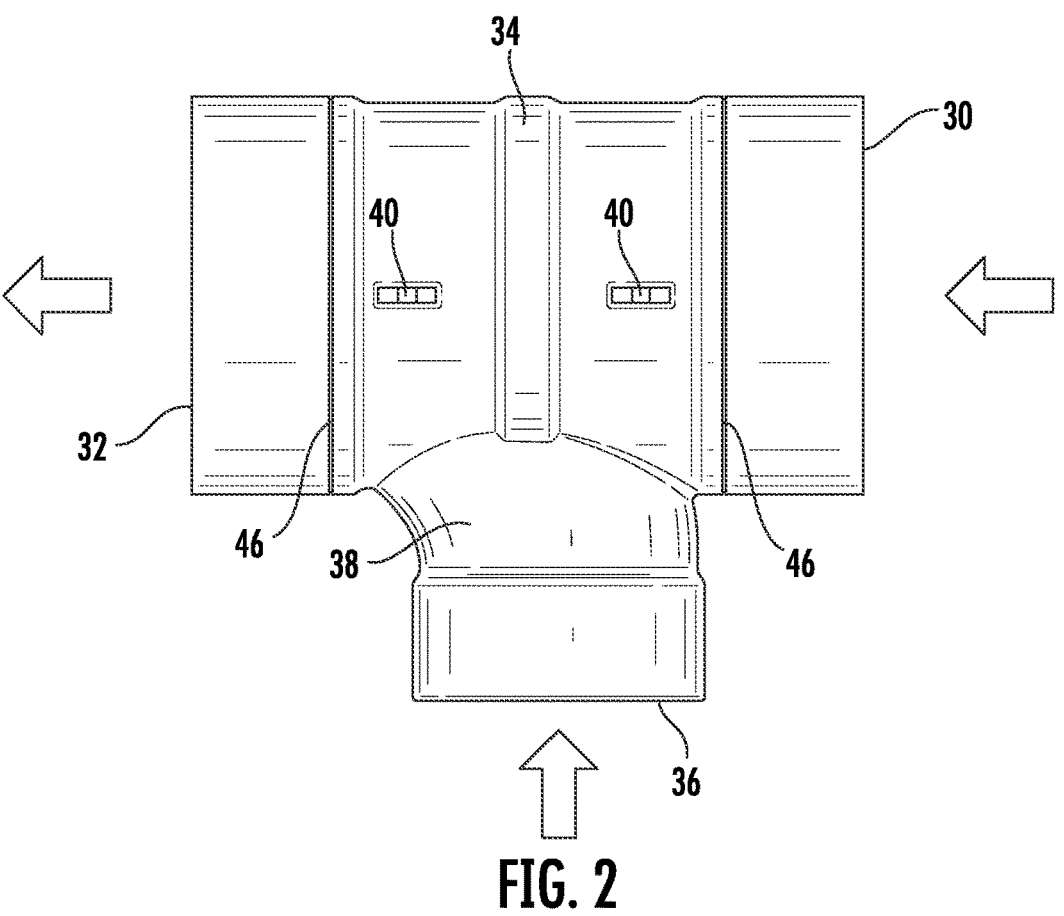
FIG. 2 is a side view of the tee coupling showing the airflow from right to left in the figure where the airflow is shown by the large arrows of the figure.
Figure 3:
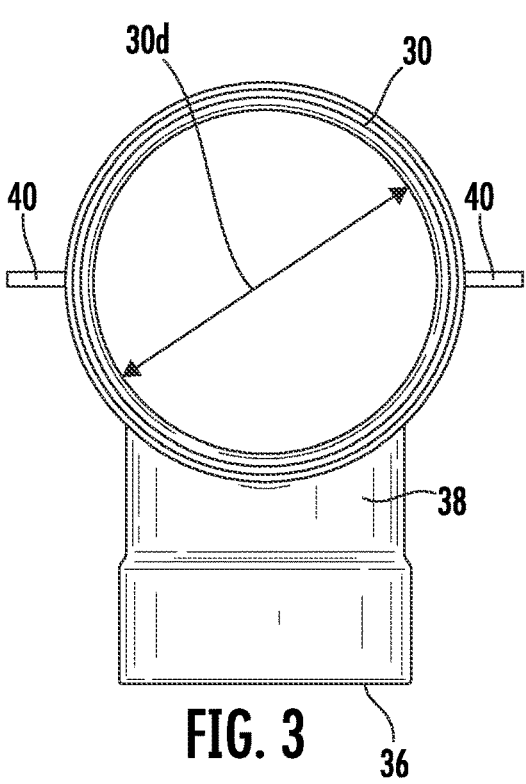
FIG. 3 is a front view of the tee coupling with an exemplary demonstration of the presence of tabs for mounting conduit of FIG. 2.
Figure 4:
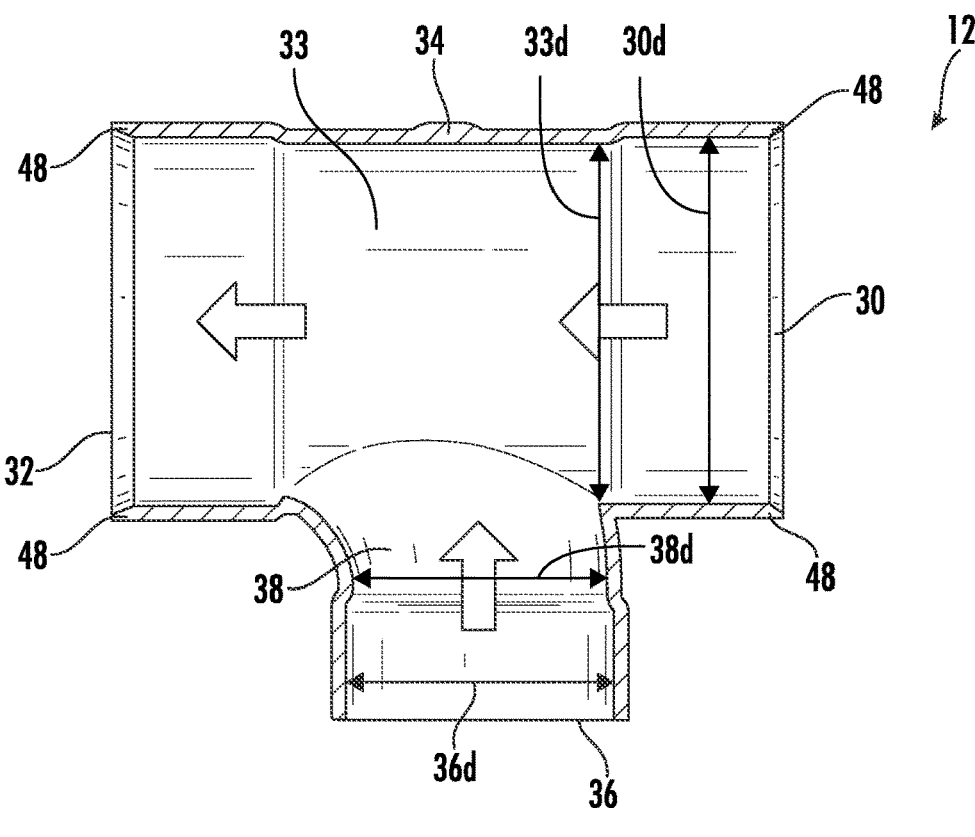
FIG. 4 is a cross-section view of the tee coupling from line A.
Figure 5:
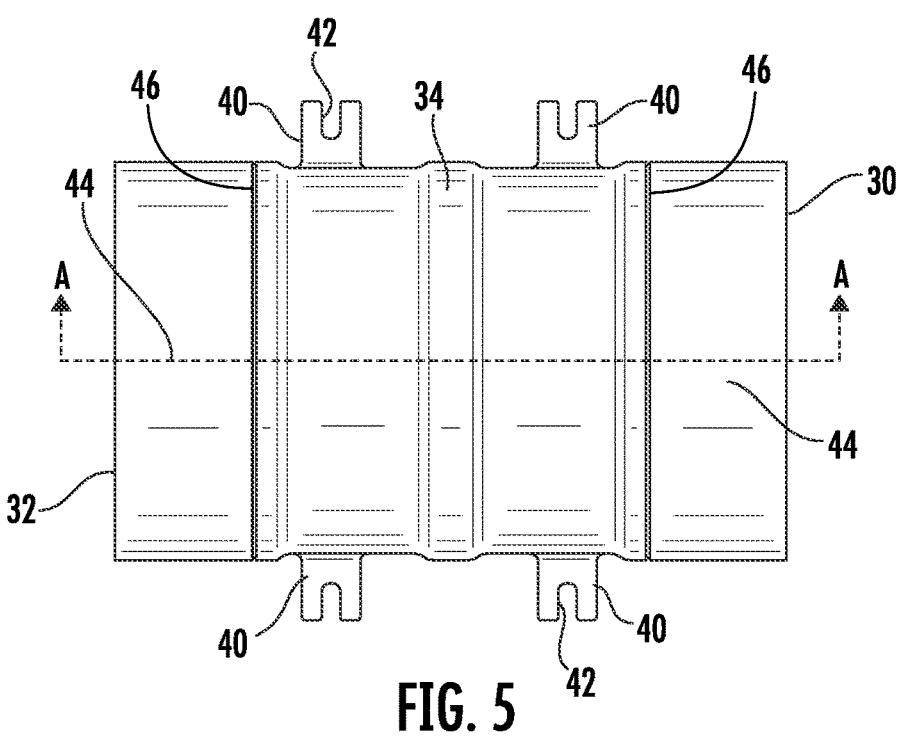
FIG. 5 is a top view of a tee coupling with an exemplary demonstration of the presence of tabs for a mounting conduit.

There may be a throat 38 between the third end 36 and the main portion of the tee coupling 12. As shown in FIGS. 2 and 4, the throat may be curved or angled in the direction of airflow where it meets the main body portion so as to ease the airflow entering the main vacuum line 14 from the third end 36. The side of the throat proximate the airflow intake from the main vacuum line 14 is curved at a bend that is less concave than the opposite side of the throat proximate the airflow outlet, which is more concave than the opposing side. (see FIG. 2). This curve reduces the turbulence caused by the airflow from the third end 36 as it joins the main airflow through the main vacuum line 14 and allows the use of a more efficient vacuum pump. The air entering the main vacuum line is partially directed into the airflow pathway of the main vacuum line as the air enters the main vacuum line.

In the case of an imperfect fit between the main vacuum line 14 and the sanitary tee coupling 12, a chamfer 48 may be cut or molded into the first and second ends 30, 32 for an O-ring (not shown) to be placed, sealing the junction of the tee 12 and the main vacuum line 14. Silicon sealant around the O-ring may also be used. The chamfer is typically an angled portion around the entire perimeter of the first end and/or the second end, but could be instead a curved surface that mates more with the curvature of the O-ring employed. Whatever configuration, the configuration facilitates an airtight or essentially air tight seal between the sanitary tee coupling 12 and the main vacuum line 14. To minimize or eliminate the movement of the segment of the main vacuum line 14 with respect to the sanitary tee coupling 12, a fastener such as a self-tapping screw may be run through the outer portion of the sanitary tee coupling 12 and through the main vacuum line 14.

A dimple 44 may be molded or drilled into the sanitary tee providing an easy location to run the fastener at a distance from the ends 30, 32 and where the segment of the main vacuum line 14 is likely to have some sheet metal or PVC piping to attach. The inner diameter of the main portion 33*d* of the sanitary tee coupling 12 between the first and second ends 30, 32 may be smaller than the outer diameters of the segments 11 of the main vacuum line 14, and the inner diameter 38*d* of the throat 38 may be smaller than the outer diameter of the outlet pipe 26. The diameters are set to prevent the segments of the main vacuum line 14 and the outlet pipe 26 from being inserted far enough into their respective ends to ensure all openings within the tee coupling 12 are free and open and allow airflow from filtration element 18 through the third end 36, into the main airflow, and out the downstream end 32. Instead of a dimple, a small elevated hill may be employed. Something to identify where the fastening device such as a screw can be located and engage the sanitary tee coupling 12 with the pipe spaced therein. The dimple or elevated portion/hill may be completely omitted as well or not uses when connecting the piping components of the present systems.

The sanitary tee coupling 12 may be sized such that it has the proper measurements to fit with both PVC and standard metal piping that is used in a commercial vehicle vacuum system 10. The first end 30 and second end 32 of the sanitary tee coupling 12 may have a six inch inner diameter 30*d*, to be adapted to the metal main vacuum line 14 outer diameter. As shown in FIG. 4, the first end 30 and second end 32 of the sanitary tee coupling 12 may further have a 6⅝ inch outer diameter, to be adapted to engage existing PVC piping of that standard six inch size PVC pipe. The third end 36 of the tee coupling 12 may have a 4½ inch outer diameter, and a four inch inner diameter 36*d* to be adapted to a 4" outlet pipe 26 on the cyclonic separator 18.

In addition to the sanitary tee coupling 12 being free of an adapter, the sanitary tee coupling 12 typically contains a plurality of tabs 40 for mounting conduit placed anywhere along the exterior perimeter of the tee coupling 12. The tabs 40 may be located in a position inset from the ends such that a PVC fitting can be inserted over the first end 30 or second end 32 without hindrance. The center of the tee coupling 12 may further include a stiffening rib 34 to allow for added strength. The stiffening rib 34 also provides a strengthened surface for an installer to strike with a hammer or other force application machine to engage the cyclonic separator 18 to the sanitary tee conduit 12.

The tabs 40 may attach to brackets (not shown) and may be molded onto the sanitary tee coupling 12. Slots 42 may be provided on the tabs 40 for ease of attachment or for ease of injection molding of the sanitary tee coupling. The slots 42 are sized to fit a standard ¼ inch bolt through it. While slots are employed the tabs could have holes therein instead of utilizing slots. The brackets (not shown) are adapted to conveniently guide various conduits, including LED lighting or piping for compressed air, in an aesthetically pleasing and functional manner. The brackets may be any conduit hanger bracket such as a steel ¾ inch hanger bracket that uses a bolt (for example, a HUBBELL-RACO™ 2053B5 bracket or another similar bracket). The use of the tabs 40 that are molded onto the sanitary tee coupling to engage the brackets that hold conduit eliminates the need to use pipe clamps on various locations of the sanitary tee coupling. The brackets may be for mounting conduit hangers or hose clamps for running compressed air and electrical lines along the overhead piping instead of running those systems underground and stubbing those up at each arch location where a vacuum hose or hoses will be employed.

On the exterior of the upstream and downstream ends 30, 32 there may be a groove 46 molded or cut into the exterior surface near the main body portion. The grooves 46 allow a user to easily measure the length of a segment of the main vacuum line 14 to the correct length between tee couplings 12. The groove allows an installer to measure the length of main conduit segments 11. When two of sanitary tee couplings are sitting on top of arches of the vacuum systems of the present disclosure, a user can readily and easily measure from the groove on one sanitary tee coupling 12 to the groove on the next adjacent sanitary tee coupling 12 to get the appropriate cut length for a given conduit segment 11. The groove 46 may be biased toward the main body portion of the sanitary tee coupling 12 to ensure good overlap of the segment but not directly at the junction of the ends 30, 32 and the main body portion to allow for some tolerance in measurement.

Where a range of values is provided, it is understood that each intervening value, to the tenth of the unit of the lower limit unless the context clearly dictates otherwise, between the upper and lower limit of that range, and any other stated or intervening value in that stated range, is encompassed within the scope of the present disclosure. The upper and lower limits of these smaller ranges may independently be included in the smaller ranges, and are also encompassed within the scope of the present disclosure, subject to any specifically excluded limit in the stated range. Where the stated range includes one or both of the limits, ranges excluding either or both of those included limits are also included in the scope of the present disclosure.

In this specification and the appended claims, the singular forms "a," "an" and "the" include plural reference unless the context clearly dictates otherwise.

"Consisting essentially of" in the context of the claims of this application limits the scope of a claim or claim element to the specified materials or steps "and those that do not materially affect the basic and novel characteristic(s)" of the claimed invention as would be known by those of ordinary skill in the art whether or not such a composition is disclosed in the application or not as affecting the basic and novel characteristic.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two or more components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A commercial vehicle vacuum system comprising:
a vacuum source;
a main vacuum line connected to the vacuum source, the main vacuum line comprising a plurality of main vacuum line segments each having a main line outer diameter;
a handheld vacuum line coupled to the main vacuum line;
a filtration element disposed between the handheld vacuum line and the main vacuum line, the filtration element comprising an inlet attached to the handheld vacuum line, a filtration element outlet, and an outlet pipe attached to the filtration element outlet having an outlet outer diameter; and
a tee coupling for coupling the handheld vacuum filtration element to the main vacuum line, the tee coupling comprising:

a main body portion having a substantially cylindrical shape with a central longitudinal axis, the main body portion having a main body inner diameter and a main body outer diameter;
a downstream end portion and an upstream end portion extending in opposite directions away from the main body portion and concentric with the central longitudinal axis of the main body, the downstream end portion having a downstream inner diameter and a downstream outer diameter and the upstream end portion having an upstream inner diameter and an upstream outer diameter;
a vacuum inlet portion that engages the outlet pipe attached to the filtration element outlet and wherein the vacuum inlet portion extends downwardly from the main body portion at an angle from the central longitudinal axis and wherein the vacuum inlet portion has a vacuum inlet portion inner diameter and a vacuum inlet portion outer diameter;
a throat portion between the vacuum inlet portion and the main body portion wherein the throat portion has an interior diameter that is less than the vacuum inlet portion inner diameter and wherein an interior surface of the throat portion has a curved interior surface such that it directs an intake airflow into the main body portion from the throat portion in a direction of a main vacuum line airflow through the main body portion during use and at an angle that is not perpendicular to the direction of the main vacuum line airflow; and
at least one tab integrally formed with the tee coupling and extending away from the main body portion perpendicularly or substantially perpendicularly to the main body,
wherein the at least one tab defines a planar surface and the at least one tab has a hole or slot therein passing through the planar surface,
wherein a plane that is coplanar with the planar surface of the at least one tab does not pass through the vacuum inlet portion, and
wherein the main body inner diameter is less than the upstream inner diameter and the downstream inner diameter.

2. The commercial vehicle vacuum system of claim 1, wherein the upstream inner diameter and the downstream inner diameter are the same or substantially the same and wherein the angle the vacuum inlet portion extends downwardly from the main body portion is at least substantially ninety degrees.

3. The commercial vehicle vacuum system of claim 1, wherein the vacuum inlet portion extends from the main body portion perpendicular to the axis and wherein the tee coupling comprises a glass filled polypropylene and the tee coupling is black and the plurality of main vacuum line segments comprise aluminum.

4. The commercial vehicle vacuum system of claim 3, wherein the throat portion of the tee coupling is curved towards the downstream end portion and has a narrow end and a wide end, wherein the wide end opens into the main vacuum line and has a wide end opening with a wide end opening surface area that is greater than both a narrow end opening surface area of a narrow end opening and a vacuum inlet portion surface area.

5. The commercial vehicle vacuum system of claim 4, wherein the tee coupling further comprises a first groove about a circumference of the upstream end portion proximate the main body portion and a second groove about the circumference of the downstream end portion proximate the main body portion wherein the first groove and the second groove are visible to the naked eye.

6. The commercial vehicle vacuum system of claim 1, wherein the tee coupling further comprises a stiffening rib that is integral with the main body portion and positioned circumferentially around a periphery of the main body portion wherein the stiffening rib is a portion of the main body portion that has a greater wall thickness than a remaining wall portion of the main body portion.

7. The commercial vehicle vacuum system of claim 1, wherein the hole or slot formed in the at least one tab is sufficiently sized to receive a bolt that is a ¼ inch bolt or larger.

8. The commercial vehicle vacuum system of claim 7, wherein the hole or slot formed in the at least one tab is a slot that is configured to be engaged to a compressed air conduit, an electrical line conduit or a compressed air and an electrical line conduit mounting bracket.

9. The commercial vehicle vacuum system of claim 1, wherein the downstream end portion and the upstream end portions each have a chamfered surface that engages a main vacuum line segment of the plurality of main vaccuum segments.

10. The commercial vehicle vacuum system of claim 9, wherein an O-ring is engaged with each of the chamfered surfaces of the downstream end and the chamfered surface of the upstream end, respectively.

11. A tee coupling comprising:
a main body portion having a substantially cylindrical shape with a central longitudinal axis, the main body portion having a main body inner diameter and a main body outer diameter;
a downstream end portion and an upstream end portion extending in opposite directions away from the main body portion and concentric with the central longitudinal axis of the main body, the downstream end portion having a downstream inner diameter and a downstream outer diameter and the upstream end portion having an upstream inner diameter and an upstream outer diameter;
a vacuum inlet portion that engages an outlet pipe attached to the filtration element outlet and wherein the vacuum inlet portion extends downwardly from the main body portion at an angle from the central longitudinal axis and wherein the vacuum inlet portion has a vacuum inlet portion inner diameter and a vacuum inlet portion outer diameter;
a throat portion between the vacuum inlet portion and the main body portion wherein the throat portion has an interior diameter that is less than the inner diameter of the vacuum inlet portion inner diameter and wherein the interior surface of the throat portion has a curved interior surface such that it directs an intake airflow into the main body portion from the throat portion in the direction of a main vacuum line airflow through the main body portion during use and at an angle that is not perpendicular to the direction of the main vacuum line airflow through the main body portion; and
at least one tab integrally formed with the tee coupling and extending away from the main body portion perpendicularly or substantially perpendicularly to the main body,
wherein the at least one tab defines a planar surface and the at least one tab has a hole or slot therein passing through the planar surface, wherein a plane that is coplanar with the planar surface of the at least one tab does not pass through the vacuum inlet portion, and
wherein the main body inner diameter is less than the upstream inner diameter and the downstream inner diameter.

12. The tee coupling of claim 11, wherein the vacuum inlet portion extends from the main body portion perpendicular to the axis and wherein the tee coupling comprises a glass filled polypropylene and the tee coupling is black.

13. The tee coupling of claim 12, wherein the throat portion of the tee coupling is curved towards the downstream end portion and has a narrow end and a wide end, wherein the wide end opens into a main vacuum line and has a wide end opening with a wide end opening surface area that is greater than both a narrow end opening surface area of a narrow end opening and a vacuum inlet portion surface area.

14. The tee coupling of claim 11, wherein the tee coupling further comprises a stiffening rib that is integral with the main body portion and positioned circumferentially around a periphery of the main body portion wherein the stiffening rib is a portion of the main body portion that has a greater wall thickness than a remaining wall portion of the main body portion.

15. The tee coupling of claim 11, wherein the downstream end portion and the upstream end portions each have a chamfered surface that faces outwardly and away from the main body portion.

16. The tee coupling of claim 11 further comprising a first visible circumferential groove on an exterior surface of the downstream end portion and proximate the main body portion and a second visible circumferential groove on an exterior surface of the upstream end portion and proximate the main body portion.

17. The tee coupling of claim 11 further comprising a first visible circumferential groove on an exterior surface of the downstream end portion and a second visible circumferential groove on an exterior surface of the upstream end and wherein the at least one tab comprises a first pair of tabs and a second pair of tabs each integrally formed with the tee coupling and spaced apart from one another wherein the first pair of tabs and the second pair of tabs are on opposite sides of the main body portion of the tee coupling and wherein the first pair of tabs and the second pair of tabs each comprises an upstream tab and a downstream tab wherein the upstream tabs define an upstream plane being coplanar with the upstream pair of tabs and the downstream tabs define a downstream plane being coplanar with the downstream pair of tabs and wherein the upstream plane and the downstream plane are coplanar,
Note: the term "tabular plane" is not a known term in the art or clearly defined in the application as a whole, This amendment would clarify the limitation.
18. A tee coupling comprising:
a main body portion having a substantially cylindrical shape with a central longitudinal axis, the main body portion having a main body inner diameter, a main body outer diameter, and a stiffening rib located vertically along a periphery of the main body portion;
a downstream end portion and an upstream end portion extending in opposite directions from the main body portion concentric with the central longitudinal axis, the downstream end portion having a downstream inner diameter and a downstream outer diameter, the upstream end having an upstream inner diameter and an upstream outer diameter wherein the downstream inner diameter is larger than the main body inner diameter and the upstream inner diameter is larger than the main body inner diameter, and the downstream end portion and the upstream end portion each have a chamfered exterior facing edge;

wherein the main body outer diameter of the main body portion is not as large as the upstream outer diameter and the downstream outer diameter; and a third end extending downwardly from the main body portion at an angle from the central longitudinal axis, the third end having a third inner diameter; and a throat portion between the third end and the main body portion wherein the throat portion has an interior diameter that is less than the inner diameter of the third end inner diameter and wherein the interior surface of the throat portion has a curved interior surface configured to direct an intake airflow into the main body portion from the throat portion in the direction of airflow through the main body portion during use and at an angle that is not perpendicular or parallel to the direction of the airflow through the main body portion;

wherein the third end extends from the main body portion perpendicular to the central longitudinal axis and wherein the tee coupling comprises a glass filled polypropylene;

wherein the tee coupling further comprises a first visible circumferential groove on an exterior surface of the downstream end portion and proximate the main body portion and a second visible circumferential groove on an exterior surface of the upstream end and proximate the main body portion, at least one tab integrally formed with the tee coupling and extending away from the main body portion perpendicularly or substantially perpendicularly to the main body, wherein the at least one tab defines a planar surface and the at least one tab has a hole or slot therein passing through the planar surface, and wherein a plane that is coplanar with the planar surface of the at least one tab does not pass through the third end.

\* \* \* \* \*